Dec. 16, 1958 A. STAVRAKIS ET AL 2,864,621

WEB REELING SYSTEM

Filed Oct. 20, 1954

INVENTORS
ALEXANDER STAVRAKIS
& CHARLES J. KENNEDY
BY Morris L. Rakkin
ATTORNEY 2,864,621
Patented Dec. 16, 1958

2,864,621

WEB REELING SYSTEM

Alexander Stavrakis, Upper Darby, Pa., and Charles J. Kennedy, Haddonfield, N. J., assignors to Radio Corporation of America, a corporation of Delaware Application October 20, 1954, Serial No. 463,550

5 Claims. (Cl. 274—4)

This invention relates to tape reeling systems, and more particularly to a feed system for magnetic tape recording apparatus featuring a combination transducer pressure pad and brake.

In the art of magnetic recording, systems have been proposed for storing pulse coded data as magnetic pulses on a magnetic record member. In the apparatus used in translating such pulses, means are provided for rapidly starting and/or stopping the record bearing tape.

It is an object of the present invention to provide an improved tape driving system including tape motion arresting means.

It is another object of this invention to provide an improved tape driving system as set forth wherein a brake member, when not used to arrest the motion of the tape, serves as a pressure pad.

It is a further object of this invention to provide a combined tape motion arresting device and pressure pad which is simple both in construction and in operation.

In accomplishing these objects, there has been provided, in accordance with the present invention, a pressure shoe which is normally spring biased into resilient engagement with the back surface of a tape record member as the record member passes in contact with a signal translating head or transducer. Means are provided for selectively applying additional force on the shoe whereby the shoe exerts sufficient pressure on the tape record member to stop it substantially instantaneously.

A better understanding of this invention may be had from the following detailed description when read in connection with the accompanying drawing in which.

Figure 1:
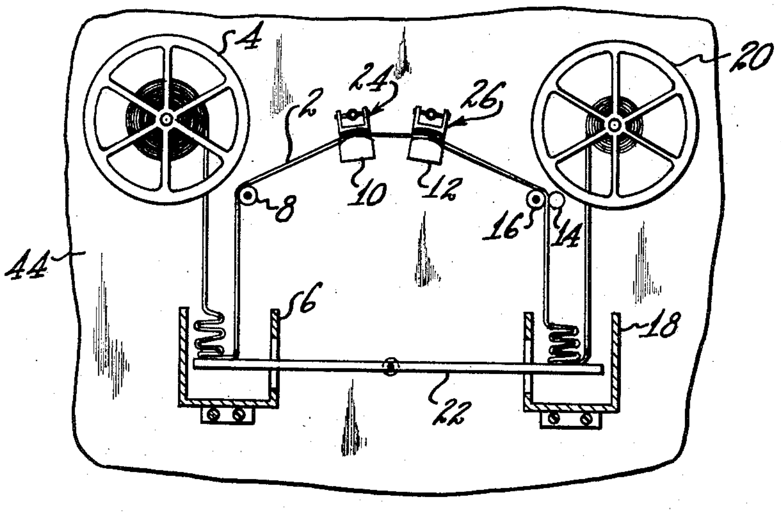
Fig. 1 is a schematic representation of a tape reeling system embodying the present invention.

Referring now to the drawing in more detail, there is shown in Fig. 1 a web reeling system embodying the present invention. In the illustrated system, the web comprises a magnetic record tape member 2 which is fed from a supply reel 4 to a first intermediate bin 6 and thence over a guide member 8. Following the guide member 8 in the path of advancement of the tape, there is a set of magnetic record transducers 10 and 12. The tape is pulled over these transducers by a capstan 14 operating in cooperative association with a pinch roller 16. Following the pinch roller 16 and capstan 14, there is a second intermediate bin 18 into which tape is fed from the capstan 14 and from which the tape is pulled by a take-up reel 20. The intermediate bins 6 and 18 provide means for accommodating a relatively long soft loop of tape so that the tape passing the transducer stage 10 may be accelerated very rapidly without the necessity of first overcoming the inertia of either of the reels. Means such as a balance beam 22 is associated with the bins 6 and 18 to measure the relative quantity of the tape in each of the bins. Tilting of the balance beam 22 by inequalities of the quantity of the tape in the respective bins, energizes suitable motors (not shown) for effecting the drive of the two reels. The reeling system involving the use of the bins and the balance beam control does not form a part of this invention and need not be further described.

In the system shown in Fig. 1, the first transducer 10 may, for example, be an erase head which, when energized, erases any previously recorded signals on the tape record member 2. The second transducer 12 may be a record or reproduce head.

In order to assure an intimate physical contact between the transducers and the tape passing thereover, pressure pad or shoe assemblies 24 and 26 are positioned adjacent the transducers 10 and 12, respectively, and on the opposite side of the tape 2 from the transducers. These pressure pad or shoe assemblies 24 and 26 are shown more clearly in Figs. 2 and 3.

Figure 2:
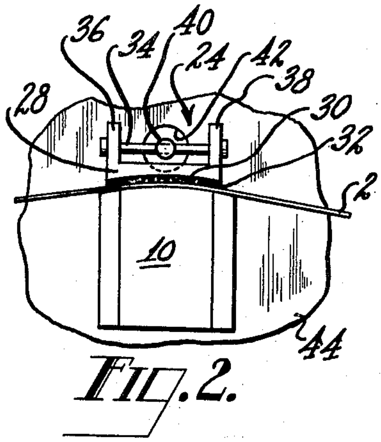
Fig. 2 is a front elevation, on an enlarged scale of a portion of the apparatus shown in Fig. 1.
Figure 3:
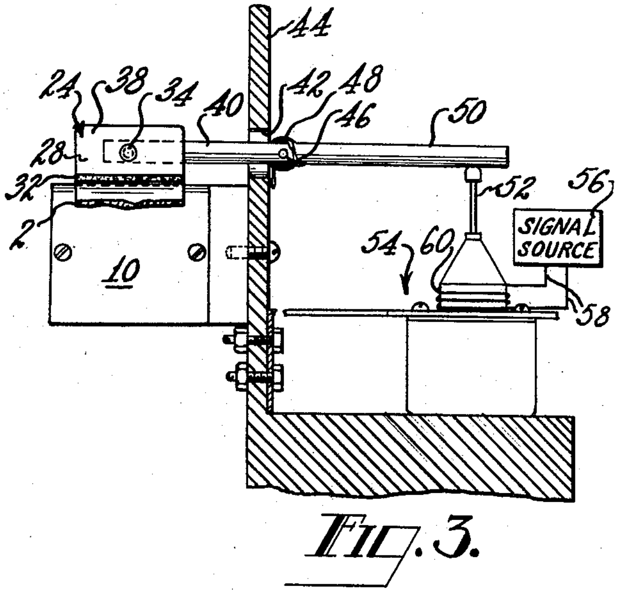
Fig. 3 is a side elevational view partly in cross-section of that portion of the apparatus shown in Fig. 1 embodying the present invention.

In Figs. 2 and 3, it may be seen that each of the pressure pad or shoe assemblies 24 and 26 comprises a shoe member 28 which is contoured to match the shape of the surface of the transducer with which it is associated. The contoured face 30 of the shoe member 28 has a layer of resilient friction material 32, such as felt. A pivot pin 34 passes through the upstanding legs 36 and 38 of the shoe member 28 and through an operating arm 40. This arrangement allows the pressure pad assembly to be self-centering with respect to pressure applied on the exposed face or back of a tape member 2 passing over the transducer. Thus, any pressure applied by the pressure pad assembly is equally distributed with respect to the width of the tape record member 2. The operating arm 40 extends through a suitable opening 42 in the mounting panel 44 and pivots about a mounting pin 46. A bias spring 48 is associated with the operating arm in the area of the mounting pin 46, biasing the shoe member 28 in a direction to exert a predetermined amount of pressure on the back of the tape record member 2. This pressure is the pressure normally required to assure adequate engagement of the tape with the transducer.

The operating arm 40 extends appreciably beyond the mounting pin 46 as an extension 50. The extension 50 is engaged by the operating ram 52 of an electrodynamic driver unit 54 which may be of the type frequently used as the driving motor of a dynamic speaker. Suitable actuating signals are supplied from a source 56 through leads 58 to the moving coil 60 of the dynamic driver unit 54. The moving coil 60 operates in a magnetic field developed by any known structure in the driver unit. Application of a signal from the source 56 to this coil 60 causes the moving coil, and hence the operating ram 52, to be moved toward the extension 50 of the arm 40. Upward pressure on the extension of the arm causes the arm to be rotated about the mounting pin 46 thereby causing the shoe member 28 to exert additional pressure on the tape record member 2 and the transducer. This additional pressure is sufficient to substantially instantaneously stop the forward motion of the tape record member 2 with respect to the transducers. Since a soft loop in the tape is carried by the bins 6 and 18 on either side of the transducers, the inertia of the tape is the principal inertia that must be accounted for in stopping the advancement of the tape. The inertia of the reels and the reel driving means is isolated from the transducer portion of the system by means of the aforesaid soft loops.

There has thus been provided an improved tape motion arresting means wherein the arresting means serves the twofold function of applying bias pressure to the tape and is selectively operable to apply braking forces to the tape.

What is claimed is:

1. In a tape driving system in which a tape member is driven past a signal transducer, means for exerting a pressure on a surface of said tape in a direction to press said tape toward said transducer, biasing means associated with said pressure means for normally exerting a predetermined pressure on said tape, and braking means for selectively increasing said pressure to arrest the motion of said tape.

2. In a tape driving system in which a tape is driven past a signal transducer, a pressure shoe assembly positioned adjacent said transducer, bias means associated with said pressure shoe assembly for exerting a first predetermined pressure on said transducer through said shoe assembly whereby to bias a tape member passing therebetween into intimate contact with said transducer, and braking means for selectively applying a second and greater pressure on said transducer through said shoe assembly whereby to arrest the motion of a tape member passing therebetween.

3. In a tape driving system in which a tape is driven past a transducer, a pressure shoe assembly positioned adjacent the transducer, said assembly including a pressure shoe member, an operating arm pivotally supporting said shoe member, pivot means pivotally supporting said operating arm, bias means associated with said operating arm for biasing said arm about said pivot means in a direction to press said shoe member toward said transducer whereby to press a tape member passing therebetween into intimate contact with said transducer, and braking means operatively associated with said arm for selectively applying increased pressure on said shoe whereby to arrest the motion of a tape member passing between said transducer and said shoe.

4. In a tape driving system in which a tape is driven past a transducer, a pressure shoe assembly positioned adjacent the transducer, said assembly including a pressure shoe member, an operating arm pivotally supporting said shoe member, pivot means pivotally supporting said operating arm, spring bias means associated with said operating arm for biasing said arm about said pivot means in a direction to press said shoe member toward said transducer whereby to press a tape member passing therebetween into intimate contact with said transducer, and an electrically operated drive means coupled to said arm to apply increased pressure on said shoe whereby to arrest the motion of a tape member passing between said transducer and said shoe upon energization of said drive means.

5. In a system for reeling an elongated record medium along a path between a pair of reels which includes means for driving said medium at a selectable speed, mechanism for substantially instantaneously stopping the movement of said medium along said path comprising two members disposed on opposite sides of said path, said members being relatively movable with respect to each other in a direction transverse to the direction of movement of said medium along said path to engage said medium therebetween, means for advancing said members toward each other to effect engagement of said members with said medium for applying a predetermined tension to said medium along a portion of said path between said members and said driving means, said tension being sufficient to maintain said medium taut in said portion of said path, and means for forcing said members toward each other for applying additional tension thereto for overcoming the driving force provided by said driving means and to stop the movement of said medium.

References Cited in the file of this patent

UNITED STATES PATENTS

| | | |
|---|---|---|
| 1,357,391 | Freytag | Nov. 2, 1920 |
| 1,582,198 | Walbridge | Apr. 27, 1926 |
| 2,555,643 | Harrison | June 5, 1951 |
| 2,706,637 | Cain | Apr. 19, 1955 |